US010247942B2

(12) United States Patent
Rossini (10) Patent No.: US 10,247,942 B2
(45) Date of Patent: Apr. 2, 2019

(54) DEVICE FOR EXTENDING THE EXIT PUPIL AND HEAD UP DISPLAY COMPRISING SAID DEVICE

(71) Applicant: Commissariat à l'Energie Atomique et aux Energies Alternatives, Paris (FR)

(72) Inventor: Umberto Rossini, Coublevie (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 15/039,772

(22) PCT Filed: Nov. 21, 2014

(86) PCT No.: PCT/EP2014/075311
§ 371 (c)(1),
(2) Date: May 26, 2016

(87) PCT Pub. No.: WO2015/078788
PCT Pub. Date: Jun. 4, 2015

(65) Prior Publication Data
US 2017/0031161 A1 Feb. 2, 2017

(30) Foreign Application Priority Data
Nov. 29, 2013 (FR) .................. 13 61850

(51) Int. Cl.
*F21V 8/00* (2006.01)
*G02B 27/00* (2006.01)
(Continued)

(52) U.S. Cl.
CPC ....... *G02B 27/0101* (2013.01); *G02B 6/0055* (2013.01); *G02B 27/0081* (2013.01);
(Continued)

(58) Field of Classification Search
CPC ............ G02B 27/0081; G02B 27/0101; G02B 2027/0118; G02B 2027/012;
(Continued)

(56) References Cited

U.S. PATENT DOCUMENTS

| 2004/0062502 A1* | 4/2004 | Levola ................. G02B 5/1866 385/129 |
| 2005/0286266 A1 | 12/2005 | Park |

(Continued)

FOREIGN PATENT DOCUMENTS

| WO | 20070290032 A1 | 3/2007 |
| WO | 20070290034 A1 | 3/2007 |

(Continued)

OTHER PUBLICATIONS

Written Opinion of the International Searching Authority for International Application No. PCT/EP2014/075311, 5 pages.
(Continued)

*Primary Examiner* — Kimberly N. Kakalec
(74) *Attorney, Agent, or Firm* — Moreno IP Law LLC (57) ABSTRACT

An optical device comprises a transparent plate the first surface of which is reflective; a first partially reflective and partially transmissive layer covering a second surface of the transparent plate opposite the first surface, and a second layer covering the surface of the first layer opposite the transparent plate, wherein the second layer is made of a material having an optical index which differs from the optical index of the transparent plate by less than 10% and preferably by less than 5%, and the second layer comprises, on the surface thereof opposite the first layer, structures forming a diffraction grating suitable for promoting the extraction of light towards the outside of the transparent plate.

13 Claims, 4 Drawing Sheets

(51) Int. Cl.
*G02B 27/01* (2006.01)
*G02B 27/42* (2006.01)

(52) U.S. Cl.
CPC ..... *G02B 27/0172* (2013.01); *G02B 27/4205* (2013.01); *G02B 2027/015* (2013.01); *G02B 2027/0125* (2013.01)

(58) Field of Classification Search
CPC .... G02B 2027/0121; G02B 2027/0123; G02B 2027/0125; G02B 27/0172
USPC ............................ 359/13, 618, 629, 630, 633
See application file for complete search history.

(56) References Cited

U.S. PATENT DOCUMENTS

| | | | |
|---|---|---|---|
| 2006/0013015 A1 | 1/2006 | Hashimoto | |
| 2008/0174850 A1* | 7/2008 | Sakata | G02B 27/01 359/279 |
| 2008/0285137 A1* | 11/2008 | Simmonds | G02B 27/0081 359/630 |
| 2009/0015929 A1* | 1/2009 | DeJong | G02B 27/0081 359/633 |
| 2009/0097122 A1* | 4/2009 | Niv | G02B 5/1866 359/575 |
| 2009/0153969 A1* | 6/2009 | Saito | G02B 5/1814 359/576 |
| 2010/0246003 A1* | 9/2010 | Simmonds | G02B 27/0081 359/567 |
| 2010/0321781 A1* | 12/2010 | Levola | G02B 27/0081 359/569 |
| 2011/0013245 A1* | 1/2011 | Tanaka | G02B 26/105 359/201.2 |
| 2011/0248904 A1* | 10/2011 | Miyawaki | G02B 27/017 345/7 |
| 2012/0044572 A1* | 2/2012 | Simmonds | G02B 6/0038 359/630 |

FOREIGN PATENT DOCUMENTS

| | | |
|---|---|---|
| WO | 2010119240 A1 | 10/2010 |
| WO | 2013033274 A1 | 3/2013 |

OTHER PUBLICATIONS

Homan, Malcolm; "The use of optical waveguides in Head Up Display (HUD) applications"; Year: 2013; Proc. of SPIE vol. 8736; 14 pages.
International Search Report for International Patent Application No. PCT/EP2014/075311, dated Jan. 23, 2015, 2 pages.

* cited by examiner

DEVICE FOR EXTENDING THE EXIT PUPIL AND HEAD UP DISPLAY COMPRISING SAID DEVICE

BACKGROUND

The present application relates to an optical exit pupil expansion device. It also aims at an image projection system comprising such an optical device and to a head-up display comprising such an image projection system.

DISCUSSION OF THE RELATED ART

Head-up displays, also known as HUDs, are augmented reality display systems which enable to overlay visual information on a real scene seen by an observer. In practice, such systems may be placed in the cockpit of a plane or in the interior of a vehicle.

Figure 1:
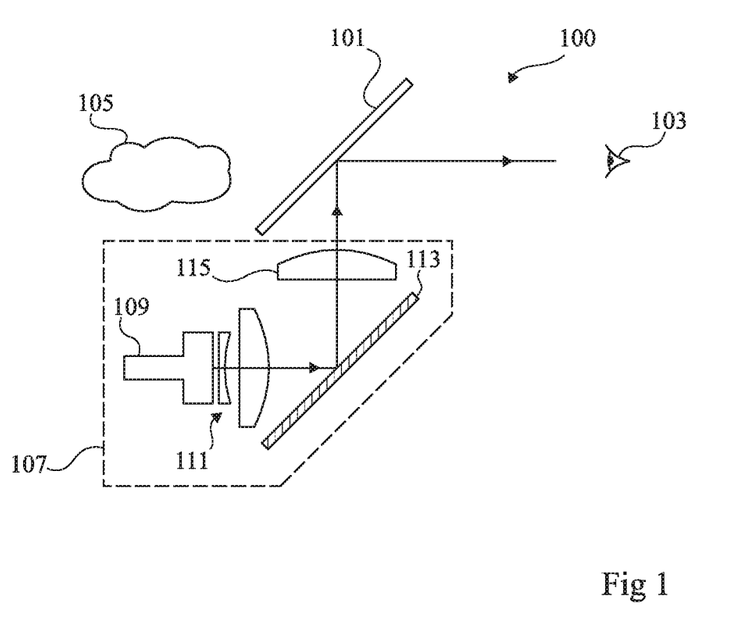
FIG. 1, previously described, is a simplified cross-section view of conventional head-up display.

FIG. 1 schematically illustrates the operation of a conventional head-up display 100.

A beam splitter 101 is placed between the eye of a user 103 and a scene to be observed 105. The objects of the scene to be observed are for example located at infinity or at a long distance from the observer. Beam splitter 101 may be placed according to an approximate 45° angle relative to the axis between scene 105 and observer 103 to transmit the information originating from scene 105 to observer 103, without altering this information.

To project an image seen at the same distance as the image of real scene 105 and to overlay it thereon, a projection system 107 is provided. System 107 comprises an image display element 109, for example, a cathode-ray tube and, opposite display element 109, an optical system 111 with spherical lenses. At the output of optical system 111, an image projection light beam emitted by element 109 is deviated by approximately 90 degrees, towards beam splitter 101, by a mirror 113 placed according to an angle of approximately 45 degrees relative to the optical axis of system 111. After its reflection on mirror 113, the image projection beam crosses an output optical system 115 with spherical lenses, before reaching beam splitter 101. Optical system 111-115 is for example capable of collimating at infinity the image projection light beam emitted by element 109.

Projection system 107 is arranged so that the beam originating from output optical system 115 reaches beam splitter 101 on the side of observer 103, perpendicularly to the axis between scene 105 and observer 103. The beam of projection of the image generated by display element 109 thus reaches beam splitter 101 with an angle of incidence of approximately 45 degrees, and beam splitter 101 reflects a portion of the image projection beam towards the observer.

Beam splitter 101 combines the image of scene 105 and the image originating from projection system 107, whereby observer 103 sees an image comprising the projected image overlaid on the image of real scene 105.

To see the image projected by system 107, the observer's eye should be placed in the area of reflection of the beam originating from output optical system 115 on splitter 101. An important constraint to be respected is to take into account the possible motions of the user's head in front of the projector, and thus to provide the largest possible beam at the output of optical system 115. In other words, an optical system 111-115 having a large exit pupil should be provided. However, optical systems having a large exit pupil using conventional spherical lenses are relatively complex and bulky. Now, another major constraint in the field of head-up displays is to provide relatively compact devices, especially when they are used in plane cockpits or motor vehicle interiors of limited volume.

SUMMARY

An object of an embodiment is to provide a head-up display overcoming all or part of the disadvantages of existing head-up displays, and particularly a head-up display which is simpler and more compact than existing head-up displays.

Another object of an embodiment is to provide an image projection system overcoming all or part of the disadvantages of existing projection systems, and particularly an image projection system which is simpler and more compact than existing image projection systems.

Another object of an embodiment is to provide an exit pupil expansion device overcoming all or part of the disadvantages of existing exit pupil expansion devices, and particularly an exit pupil expansion device which is simpler and more compact than existing exit pupil expansion devices.

Thus, an embodiment provides an optical device comprising: a transparent plate having a first reflective surface; a first partially reflective and partially transmissive layer coating a second surface of the transparent plate opposite to the first surface; and a second layer coating the surface of the first layer opposite to the transparent plate, the second layer being made of a material having an optical index differing from the optical index of the transparent plate by less than 10%, preferably by less than 5%, and the second layer comprising, on its surface opposite to the first layer, structures forming a diffraction grating capable of promoting the extraction of light to the outside of the transparent plate.

According to an embodiment, the first layer has a transmission coefficient which varies gradually along at least one direction parallel to the plane of the second surface.

According to an embodiment, the first surface of the transparent plate is coated with a non-transmissive reflective layer.

According to an embodiment, the second layer comprises, on the side of its surface opposite to the first layer, grooves with a triangular section defining prisms.

According to an embodiment, the second layer comprises, on the side of its surface opposite to the first layer, structures forming an echelette grating or blazed grating.

According to an embodiment, the first layer is a metal layer.

According to an embodiment, the optical device further comprises at least one device of injection of an image projection light beam into the transparent plate.

According to an embodiment, the injection device is located at a first end of the transparent plate, and the trans-mission coefficient of the first layer gradually increases between the first end and a second end of the transparent plate opposite to the first end.

According to an embodiment, the optical device comprises two injection devices located at opposite ends of the transparent plate, the transmission coefficient of the first layer gradually increasing between each of the ends and a central region of the transparent plate.

According to an embodiment, the optical device comprises two injection devices located at opposite ends of the transparent plate, the transmission coefficient of the first layer being constant.

Another embodiment provides a projection system comprising an image display device, and at least one optical device of the above-mentioned type.

According to an embodiment, the system comprises a first optical device of the above-mentioned type, and a second optical device of the above-mentioned type, the direction of the first device being orthogonal to the direction of the second device.

Another embodiment provides a head-up display comprising a projection system of the above-mentioned type and a beam splitter capable of combining an image projected by the projection system with an image of a real scene.

BRIEF DESCRIPTION OF THE DRAWINGS

The foregoing and other features and advantages will be discussed in detail in the following non-limiting description of specific embodiments in connection with the accompanying drawings, among which.

DETAILED DESCRIPTION

For clarity, the same elements have been designated with the same reference numerals in the different drawings. Further, the various drawings are not to scale. Further, in the following description, unless otherwise indicated, terms "approximately", "substantially", "around", and "in the order of" mean "to within 10%", and terms referring to directions, such as topping, lateral, above, under, upper, lower, vertical, horizontal, etc. apply to devices and systems oriented as illustrated in the corresponding views, it being understood that, in practice, the described devices and systems may have different directions.

Figure 2:
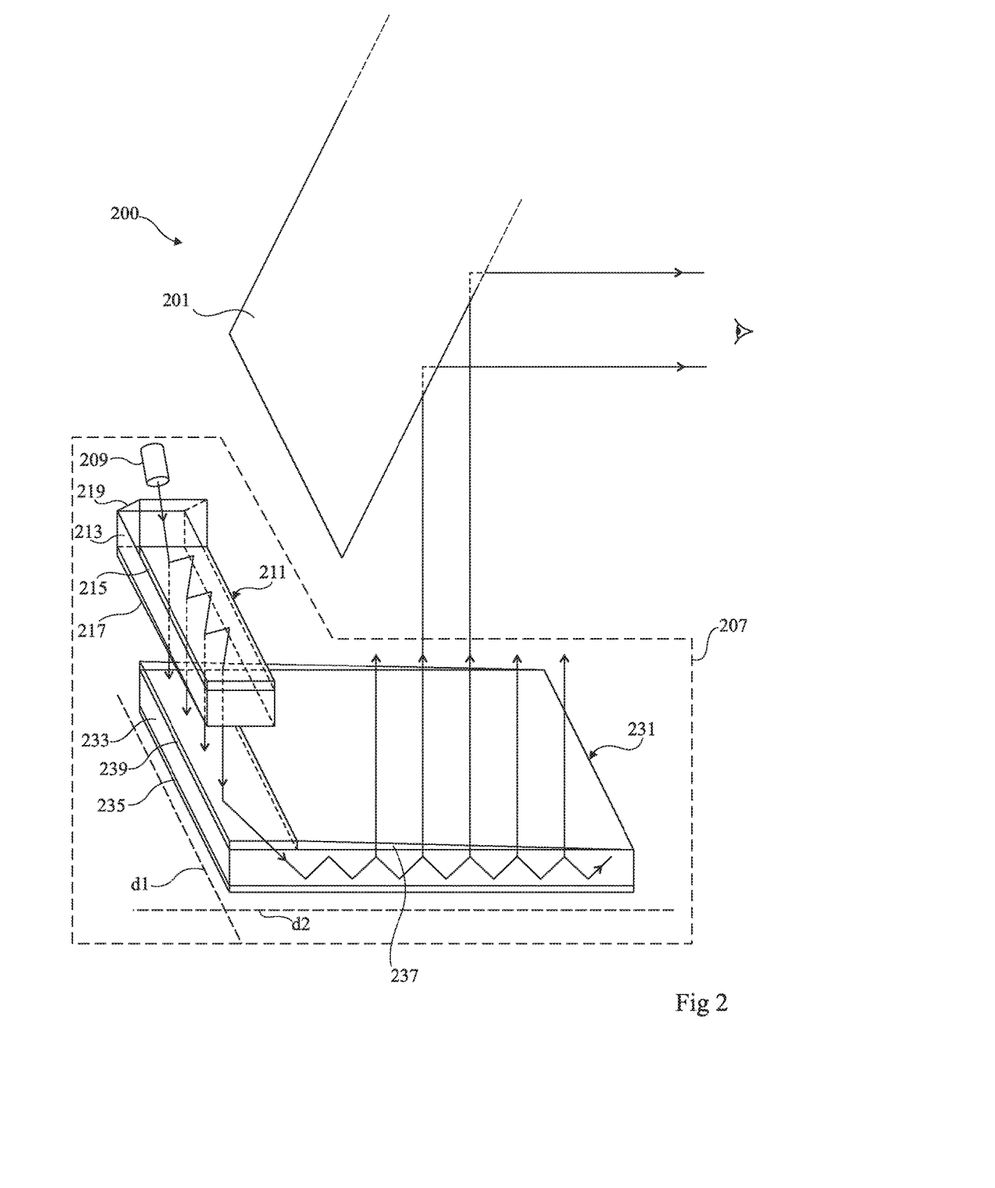
FIG. 2 is a perspective view schematically illustrating an embodiment of a head-up display.

FIG. 2 is a perspective view schematically illustrating the operation of an embodiment of a head-up display 200.

Head-up display 200 comprises a beam splitter or semi-transparent plate 201 intended to be placed between the eye of a user 203 and a scene to be observed (not shown in FIG. 2). Beam splitter 201 may be placed according to an angle of approximately 45° relative to the axis between the scene to be observed and observer 203. The described embodiments are however not limited to this specific case.

To project an image seen at the same distance as the real image of the scene and to overlay it thereon, a projection system 207 is provided. Head-up display 200 of FIG. 2 differs from head-up display 100 of FIG. 1 mainly by its projection system 207, which is simpler and more compact than projection system 107 of FIG. 1.

Projection system 207 comprises an image display device 209, capable of generating an image projection beam, for example, collimated at infinity. Device 209 may be a device with a small exit pupil, for example, in the range from a few square centimeters to a few tens of square centimeters. As an example, device 209 comprises a micro-projector with a LCD or OLED-type matrix display, capable of generating a rectangular image of a few tens of square centimeters. The described embodiments are however not limited to this specific case. More generally, it will be within the abilities of those skilled in the art to select other image display devices compatible with the described embodiments, for example, a laser scan projector.

In the example of FIG. 2, projection system 207 comprises a first exit pupil expansion device 211, capable of expanding the exit pupil of the system in a first direction, and a second exit pupil expansion device 231 coupled to device 211, capable of expanding the exit pupil of the system in a second direction, for example, approximately orthogonal to the first direction.

Exit pupil expansion device 211 comprises a transparent plate 213, for example, made of glass. In this example, the main surfaces of plate 213 are approximately rectangular and are arranged in approximately horizontal planes. The upper surface of plate 213 is coated with a non-transmissive reflective layer 215 and the lower surface of plate 213 is coated with a partially reflective and partially transmissive layer 217 having a transmission coefficient gradually varying along a direction d1 parallel to the plane of the lower surface of plate 213, the longitudinal direction of plate 213 in this example (that is, the direction parallel to the largest side of the lower and upper surfaces of the plate). Layer 215 may be a reflective metal layer having a sufficiently large thickness to avoid transmitting the light that it receives, for example, a thickness greater than 0.05 μm. Layer 217 may be a reflective metal layer having a sufficiently small thickness to transmit part of the light that it receives, for example, a thickness smaller than 0.05 μm, having its thickness gradually varying along direction d1. It should be noted that the transmission coefficient of layer 217 may progressively vary along direction d1, that is, approximately continuously, or in stages.

In this example, exit pupil expansion device 211 further comprises, in the vicinity of an end of plate 213, an input device 219 enabling to inject into plate 213 an image projection beam generated by display element 209, with an angle such that this beam propagates within plate 213, along direction d1, by reflection alternately on the lower and upper surfaces of plate 213, respectively coated with reflective layers 217 and 215. In the shown example, input device 219 is a prism made of a transparent material of same index as layer 213, having a surface in contact with an area of the upper surface of plate 213 which is not coated with layer 215, located in the vicinity of an end of plate 213, and having another surface facing display device 209 approximately orthogonal to the main projection axis of display device 209. The described embodiments are however not limited to this specific case. More generally, any other known device of injection and orientation of a light beam in a transparent plate may be used, for example, a mirror placed inside of plate 213 and inclined with respect to the planes of the lower and upper surfaces of the plate.

Device 211 operates as follows. After its injection into plate 213, the image projection light beam emitted by display device 209 propagates along general propagation direction d1, that is, along the length of plate 213 in this example, by reflection on the lower and upper surfaces of plate 213. For each reflection of the beam on the lower surface of plate 213, a portion of the beam is not reflected by layer 217 and is transmitted by this layer towards the outside of plate 213. The coefficient of light transmission by layer 217 gradually increases as the distance from input 219 of the device increases, so that, during successive reflections of the projection beam on layer 217, the light intensity of the transmitted portion of the projection beam is always approximately constant. Thus, on its lower surface side, device 211 emits an image projection beam having a decreased light intensity with respect to the beam initially emitted by display device 209, but having its cross-section increased in direction d1. Device 211 thus forms an expansion of the exit pupil of the system in direction d1.

It should be noted that device 211 may advantageously comprise, against layer 217 on the side of layer 217 opposite to plate 213, a transparent element (not shown), for example, a layer, plate, sheet, or transparent plate, preferably of same optical index as plate 213 or of optical index close to that of plate 213, for example of optical index equal to within better than 10% and preferably to within better than 5%, to that of plate 213. This transparent element advantageously enables to well control the partial reflections of the projection beam on layer 217, and to avoid for such reflections (controlled, since independent from the angle of incidence) to be disturbed by other possible reflections (dependent on the angle of incidence) on an optical diopter with a strong index difference between plate 213 and the medium located on the side of layer 217 opposite to plate 213.

Device 211 may further comprise an additional element (not shown in FIG. 2) of orientation of the output beam of device 211, arranged on the side of layer 217 opposite to plate 213. As an example, this orientation element is arranged so that the main axis of the image projection beam at the output of device 211 is approximately orthogonal to the lower surface of plate 213. An embodiment of such an element for orienting the output beam will be described in further detail hereafter in relation with FIG. 4.

Exit pupil expansion device 231 comprises a transparent plate 233, for example, made of glass. In this example, the main surfaces of plate 233 are approximately rectangular and are arranged in approximately horizontal planes. In this example, the width of the lower and upper rectangular surfaces of plate 233 is of the same order of magnitude than the length of the lower and upper rectangular surfaces of plate 213 of device 211, and plate 233 is arranged under device 211 and oriented so that the longitudinal direction of plate 233 is approximately orthogonal to the longitudinal direction of plate 213. In this example, the lower surface of device 211 is located, in vertical projection, above an area of the upper surface of plate 233 close to an end of plate 233.

The lower surface of plate 233 is coated with a non-transmissive reflective layer 235, and the upper surface of plate 233 is coated with a partially reflective and partially transmissive layer 237 having a transmission coefficient gradually varying along a direction d2 parallel to the plane of the upper surface of plate 233, the longitudinal direction of plate 233 in this example. Layer 235 may be a reflective metal layer having a sufficient thickness to avoid transmitting the light that it receives. Layer 237 may be a reflective metal layer having a sufficiently low thickness to transmit part of the light that it receives, and having its thickness gradually varying along direction d2. The transmission coefficient of layer 237 may progressively vary along direction d2, or in stages.

It should be noted that in the shown example, layer 237 does not coat the area of the upper surface of plate 233 located opposite the lower surface of device 211.

In this example, exit pupil expansion device 231 comprises an input device 239 enabling to inject into transparent plate 233 an image projection beam originating from the lower surface of device 211, with an angle such that this beam propagates within plate 233 along direction d2, by reflection alternately on the lower and upper surfaces of plate 233, respectively coated with reflective layers 235 and 237. As an example, input device 239 may comprise a transparent layer coating the area of the upper surface of plate 233 which is not coated with layer 237, this transparent layer comprising, on its upper surface side, grooves (not shown) forming prisms capable of deviating the image projection beam originating from the lower surface of device 211. The described embodiments are however not limited to this specific case. More generally, any other known device for injecting and orienting a light beam in a transparent plate may be used to couple device 211 to device 231.

The operation of device 231 is similar to the operation of device 211. After its injection into plate 233, the image projection light beam propagates within plate 233 along direction d2 (that is, along the length of the plate in this example), by reflection on the lower and upper surfaces of plate 233. For each reflection of the beam on the lower surface of plate 233, a portion of the beam is not reflected by layer 237 and is transmitted by this layer to the outside of plate 233. The coefficient of light transmission by layer 237 gradually increases as the distance from input 239 of the device increases, so that, during successive reflections of the projection beam on layer 237, the light intensity of the transmitted portion of the projection beam is always approximately constant. Thus, on its lower surface side, device 231 emits an image projection beam having a light intensity decreased with respect to the beam initially injected into the plate via input device 239, but having its cross-section increased in direction d2. Device 231 thus expands the exit pupil of the system in direction d2 (approximately orthogonal to direction d1 in this example).

It should be noted that device 231 may advantageously comprise, against layer 237 on the side of layer 237 opposite to plate 233, a transparent element (not shown), for example, a layer, plate, sheet, or transparent plate, preferably of same optical index as plate 233 or of optical index close to that of plate 233, for example of optical index equal to within better than 10% and preferably to within better than 5% to that of plate 233. This transparent element advantageously enables to well control the partial reflections of the projection beam on layer 237, and to avoid for such reflections (controlled, since independent from the angle of incidence) to be disturbed by other possible reflections (dependent on the angle of incidence) on an optical diopter with a strong index difference between plate 233 and the medium located on the side of layer 237 opposite to plate 233.

Device 231 may further comprise an additional element (not shown in FIG. 2) of orientation of the output beam of device 231, arranged on the side of layer 237 opposite to plate 233. As an example, this orientation element is arranged so that the main axis of the image projection beam at the output of device 231 is approximately orthogonal to the lower surface of plate 233.

An advantage of projection system 207 of FIG. 2 is that it is particularly simple and compact, combining a display element 209 of small dimensions with an exit pupil expansion device 211-231 which is simple and of low bulk with respect to conventional exit pupil expansion devices with spherical lenses.

Projection system 207 is for example arranged so that the beam originating from second exit optical system 231 reaches beam splitter 201, on the side of observer 203, approximately perpendicularly to the axis between the real scene and observer 203. The image projection beam thus reaches beam splitter 201 with an angle of incidence of approximately 45 degrees, and the plate reflects a portion of the image projection beam towards the observer. Beam splitter 201 combines the image of the real scene and the image originating from projection system 207, whereby observer 203 sees an image comprising the projected image overlaid on the image of the real scene.

An advantage of head-up display 200 of FIG. 2 is that it has both a large exit pupil and a small bulk, thus satisfying two significant constraints of the field of head-up displays.

Figure 3:
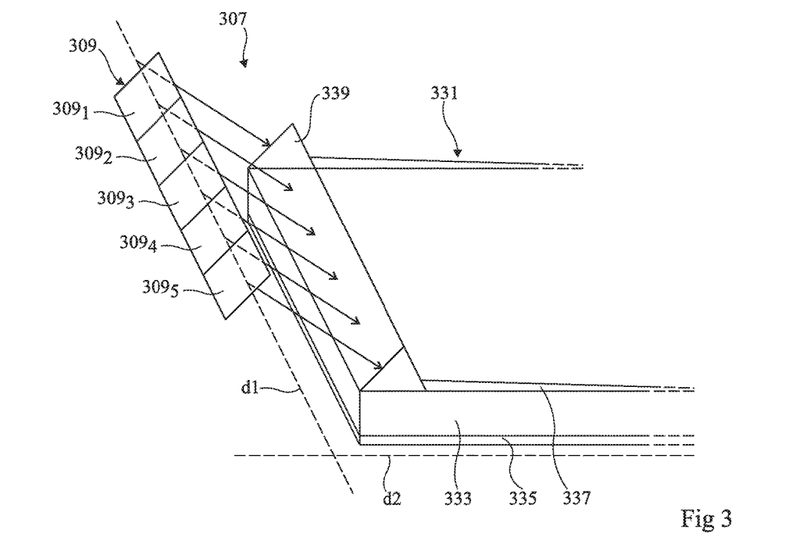
FIG. 3 is a perspective view schematically illustrating an alternative embodiment of an image projection system.

FIG. 3 is a perspective view schematically illustrating an alternative embodiment of the image projection system of FIG. 2. Projection system 307 of FIG. 3 may for example be used to replace projection system 207, in the head-up display of FIG. 2.

Image projection system 307 comprises a device 309 for displaying an image, capable of generating an image projection beam, for example, collimated at infinity. Display device 309 of FIG. 3 has an exit pupil of the same order of magnitude as that of device 209 in direction d2, but already expanded in direction d1 with respect to device 209. Display device 309 is coupled to an exit pupil expansion device 331, capable of expanding the exit pupil of the system in direction d2.

To obtain a compact display device 309 having a significant exit pupil in direction d1, it is provided to dissociate the display device into a plurality of elementary display sub-devices, five sub-devices 309i, with i being an integer from 1 to 5 in this example, aligned in direction d1. Display sub-devices 309i are for example of the same type as display device 209 of FIG. 2. As an example, each display sub-device 309i is provided to display the entire image to be projected. Display device 309 may further comprise an optical system (not shown) arranged to combine the image projection beams emitted by the different display sub-devices 309i in a beam having a large exit pupil in direction d1. The forming of a compact display device with a large exit pupil by combination of a plurality of display sub-devices is for example described in French patent application entitled "Viseur tête haute compact à faible consommation d'énergie" registered with the INPI (French patent office) by the applicant on Apr. 30, 2012 under number 1253971.

In this example, exit pupil expansion device 331 comprises a transparent plate 333, for example, made of glass, having approximately rectangular main surfaces arranged in approximately horizontal planes. In this example, the width of the lower and upper rectangular surfaces of plate 333 is of the same order of magnitude as the greatest length of the transverse cross-section of the image projection beam emitted by device 309, and plate 333 is oriented so that its longitudinal direction is approximately orthogonal to the longitudinal direction of device 309.

The lower surface of plate 333 is coated with a non-transmissive reflective layer 335, and the lower surface of plate 333 is coated with a partially reflective and partially transmissive layer 337 having a transmission coefficient which varies gradually along direction d2 (the longitudinal direction of plate 333 in this example). Layer 335 may be a reflective metal layer having a sufficiently large thickness to avoid transmitting the light that it receives, and layer 337 may be a reflective metal layer having a sufficiently small thickness to transmit part of the light that it receives, and having its thickness gradually varying along direction d2. The transmission coefficient of layer 337 may vary along direction d2 either progressively or in stages.

In this example, device 331 further comprises an input device 339 enabling to inject into transparent plate 333 an image projection beam generated by display device 309, with an angle such that this beam propagates within plate 333, along direction d2, by reflection alternately on the lower and upper surfaces of plate 333, respectively coated with reflective layers 335 and 337. In the shown example, input device 339 is a prism made of a transparent material of same index as layer 333, having a surface in contact with an area of the upper surface of plate 333 which is not coated with layer 337, located in the vicinity of an end of plate 333, and having another surface facing display device 309 approximately orthogonal to the main projection axis of display device 309. The described embodiments are however not limited to this specific case. More generally, any other known device of injection and orientation of a light beam in a transparent plate may be used.

Device 331 operates as follows. After its injection into plate 333, the image projection light beam emitted by display device 309 propagates in plate 333 along direction d2, by reflection on the lower and upper surfaces of plate 333. For each reflection of the beam on the upper surface of plate 333, a portion of the beam is not reflected by layer 337 and is transmitted by this layer to the outside of plate 333. The coefficient of light transmission by layer 337 gradually increases as the distance from input 339 of the device increases, so that, for successive reflections of the projection beam on layer 337, the light intensity of the transmitted portion of the projection beam is always approximately constant. Thus, on its lower surface side, device 331 emits an image projection beam having a light intensity decreased with respect to the beam initially emitted by display device 309, but having its section expanded in direction d2. Device 331 thus expands the exit pupil of the system in direction d2.

It should be noted that device 331 may advantageously comprise, against layer 337 of the side of layer 337 opposite to plate 333, a transparent element (not shown), for example, a layer, plate, sheet, or transparent plate, preferably of same optical index as plate 333 or having an optical index close to that of plate 333, for example, having an optical index equal to within better than 10% and preferably to within better than 5% to that of plate 333. The transparent element advantageously enables to well control partial reflections of the projection beam on layer 337, and to avoid for such reflections to be disturbed by other reflections on an optical diopter between plate 333 and the medium located on the side of layer 337 opposite to plate 333.

Device 331 may further comprise an additional element (not shown in FIG. 3) of orientation of the output beam of device 331, arranged on the side of layer 337 opposite to plate 333. As an example, the orientation element is arranged so that the main axis of the image projection beam at the output of device 331 is approximately orthogonal to the upper surface of plate 333.

An advantage of projection system 307 of FIG. 3 is that it enables to provide an output beam of stronger light intensity than system 207 of FIG. 2 (for identical luminances of the input beams emitted by display devices 209 and 309), since, in device 307, the image projection beam crosses a single exit pupil expansion device with a partially reflective and partially transmissive layer and no longer two, as in the system of FIG. 2.

Figure 4:
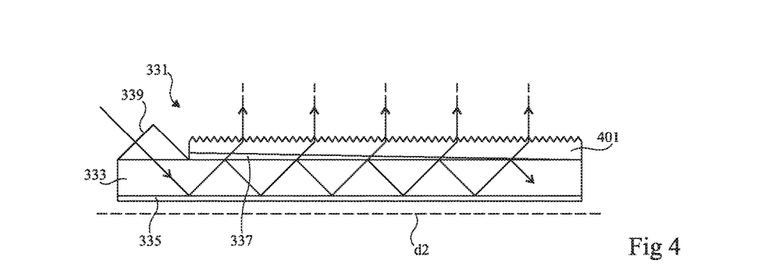
FIG. 4 is a cross-section view illustrating in further detail an embodiment of an exit pupil expansion device of the head-up display of FIG. 2.

FIG. 4 is a longitudinal side view illustrating in further detail exit pupil expansion device 331 of FIG. 3. FIG. 4 shows, in addition to the elements already shown in FIG. 3, an element 401 of orientation of the output beam of the device. Element 401 is arranged on the side of layer 337 opposite to plate 333. In this example, element 401 is a plate, sheet, layer, or film made of a transparent material, having an approximately planar lower surface in contact with the upper surface of layer 337, and having its upper surface (opposite to layer 337) comprising grooves of triangular cross-section defining prisms capable of deviating the output beam of device 331. Element 401 is preferably but not necessarily made of a material having the same refraction index as plate 333. As an example, element 401 has an optical index equal to within better than 10% and preferably to within better than 5% to that of plate 333. This advantageously enables to well control partial reflections of the projection beam on layer 337, and to avoid for such reflections to be disturbed by other reflections on an optical diopter between plate 333 and the medium located on the side of layer 337 opposite to plate 333.

Orientation element 401 operates as follows. As explained hereabove, in operation, an image projection light beam propagates in plate 333 by reflection alternately on the lower and upper surfaces of plate 333. For each reflection of the beam on the upper surface of plate 333, a portion of the beam is not reflected by layer 337 and is transmitted by this layer to the outside of plate 333. The transmitted portion of the beam then continues its trajectory in element 401, towards the upper surface of element 401 (without being deviated if the refraction index of element 401 is identical to that of plate 333). When the transmitted light reaches the upper surface of element 401, it is then deviated by the prisms formed on this surface, by an angle which depends, in particular, on the orientation of the lateral surfaces of the prisms.

Orientation elements similar or identical to element 401 of FIG. 4 may be provided in the projection system of FIG. 2, on the side of the upper surface of device 231, and/or on the side of the lower surface of device 211.

It should be noted that in all the embodiments described in the present application, if the angle of incidence of the projection beam propagating in the transparent plate is smaller than the critical total internal reflection angle in the plate, the portion of the projection beam which is not reflected by the partially reflective layer may come out of the device even in the absence of an orientation element of the type described in relation with FIG. 4. Such an orientation element may however be provided to control the output angle of the beam, but this element is then optional. However, if the angle of incidence of the projection beam is greater than or equal to the critical total internal reflection angle in the plate, an orientation element of the type described in relation with FIG. 4 should be provided, to extract from the device the light which has not been reflected by the partially reflective layer, and prevent this light from being submitted to a total reflection on the surface of the transparent plate coated with the partially reflective layer.

It should further be noted that the described embodiments are not limited to the case where the orientation element is an element based on prisms of the type described in relation with FIG. 4. Any other element capable of performing the same functions or orientation and/or extraction of the output beam may be provided, for example, a hologram or a sawtooth grating, sometimes called blazed grating or echelette grating, capable of having an optimal transmission at a specific order (order 1, for example). Thus, element 401 may be a layer having its surface opposite to layer 337 structured and forming a diffraction grating capable of promoting the extraction of light to the outside of the device.

Figure 5:
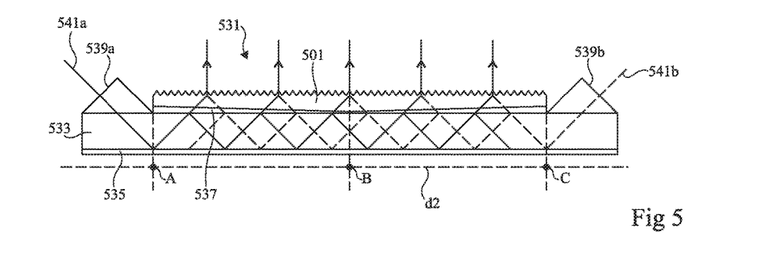
FIG. 5 is a cross-section view illustrating an alternative embodiment of an exit pupil expansion device.

FIG. 5 is a longitudinal side cross-section view illustrating in further detail an alternative embodiment of an exit pupil expansion device 531.

Device 531 comprises a transparent plate 533, for example, made of glass. In this example, the main surfaces of plate 533 are approximately rectangular and are arranged in approximately horizontal planes. In this example, the lower surface of plate 533 is coated with a non-transmissive reflective layer 535, and the upper surface of plate 533 is coated with a partially reflective and partially transmissive layer 537 having a transmission coefficient which varies gradually along a direction d2 parallel to the plane of the upper surface of the plate, the longitudinal direction of plate 533 in this example. Layer 535 may be a reflective metal layer having a sufficiently large thickness to avoid transmitting the light that it receives. Layer 537 may be a reflective metal layer having a sufficiently low thickness to transmit a portion of the light that it receives, and having its thickness gradually varying along direction d2. The transmission coefficient of layer 537 may vary progressively or in stages.

In the example of FIG. 5, layer 537 has a light transmission coefficient gradually decreasing along direction d2 from a point A, located in the vicinity of a first end of the plate, to a point B located approximately at mid-length of the plate, and then gradually increasing along direction d2 from point B to a point C located in the vicinity of a second end of the plate opposite to the first end.

In the example of FIG. 5, exit pupil expansion device 531 further comprises:
 a first input device 539a, for example, a prism, enabling to inject into transparent plate 533 a first image projection beam 541a in the vicinity of its first end (on the side of point A), with an angle such that this beam propagates within the plate along direction d2, by reflection alternately on the lower and upper surfaces of the plate; and
 a second input device 539b, for example, a prism, enabling to inject into transparent plate 533 a second image projection beam 541b in the vicinity of its second end (on the side of point B), with an angle such that this beam propagates within the plate along direction d2, by reflection alternately on the lower and upper surfaces of the plate.

It should be noted that device 531 may advantageously comprise, against layer 537 on the side of layer 537 opposite to plate 533, a transparent element (not shown), for example, a layer, plate, sheet, or transparent plate, preferably of same optical index as plate 533 or having an optical index close to that of plate 533, for example, having an optical index equal to within better than 10% and preferably to within better than 5% to that of plate 533. The transparent element advantageously enables to well control partial reflections of the projection beam on layer 537, and to avoid for such reflections to be disturbed by other reflections on an optical diopter between plate 533 and the medium located on the side of layer 537 opposite to plate 533.

Device 531 may further optionally comprise an element 501 of orientation of the output beam of the device, arranged on the side of layer 537 opposite to plate 533, for example, an orientation element of the type described in relation with FIG. 4.

In operation, a same image may be injected into plate 533 simultaneously by two different display devices or by two different projection devices (not shown), via input devices 539a and 539b.

It will be ascertained to position and orient the projection beams emitted by devices 539a and 539b so that, at the output of the device of FIG. 5, the rays corresponding to a same pixel of the projected image come out with a same angle, whether the rays originate from device 539a or from device 539b.

An advantage of the device of FIG. 5 is that it enables to increase the output light intensity with respect to a device having a single input of the type described in relation with FIG. 2, 3, or 4.

Another advantage is that the forming of the partially reflective and partially transmissive layer of the exit pupil expansion device of FIG. 5 is simpler than in devices having a single input of the type described in relation with FIGS. 2, 3, and 4. Indeed, in the device of FIG. 5, for a same distance traveled by the image projection beam within the transparent plate, the pitch or the slope of variation of the transmission coefficient of the partially reflective and partially transmissive layer may be larger than in devices with a single input, which makes the forming of such a layer easier.

As an advantageous variation, due to its simplicity of use, layer 537 may be a partially reflective and partially transmissive layer having a uniform transmission coefficient all over the device surface. In this case, the average intensity transmitted by the device is not uniform but one may for example obtain, for an image of uniform intensity projected at the device input, an output image having intensity differences which do not exceed 20%, which is sufficient for many applications.

Figure 6:
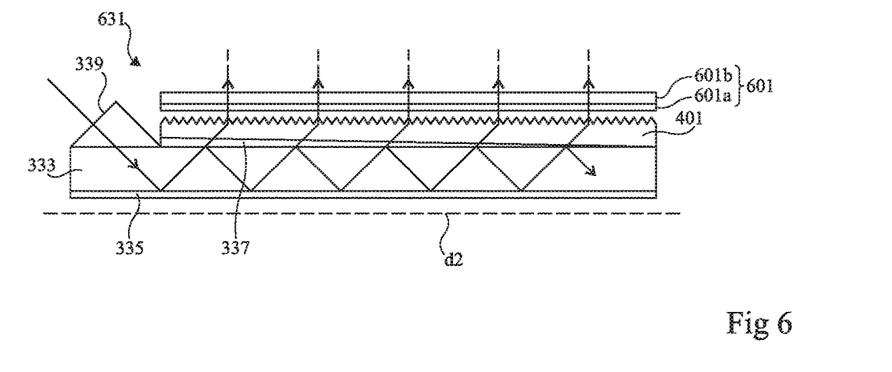
FIG. 6 is a cross-section view illustrating another alternative embodiment of an exit pupil expansion device.

FIG. 6 is a longitudinal side cross-section view illustrating an alternative embodiment of the exit pupil expansion device of FIG. 4. Exit pupil expansion device 631 of FIG. 6 comprises the same elements as exit pupil expansion device 331 of FIG. 4. Device 631 further comprises, on the side of element 401 of orientation of the output beam opposite to layer 337, a quarter-wave plate 601a and, on the side of plate 601a opposite to element 401, a rectilinear polarizer 601b. Assembly 601 formed by quarter-wave plate 601a and by polarizer 601b enables to filter possible parasitic reflections, on the upper surface of layer 337, of light originating from the outside of the system, for example, sunlight.

Specific embodiments have been described. Various alterations, modifications, and improvements will readily occur to those skilled in the art.

In particular, in the above-described embodiments of exit pupil expansion devices having a partially reflective and partially transmissive layer, if the angle of incidence of the beam projected in the transparent plate is greater than or equal to the critical total internal reflection angle of light in the plate, the non-transmissive reflective layer (respectively 215 and 235 in FIG. 2, and 335 in FIGS. 3 and 4) coating the surface of the transparent plate opposite to the partially reflective layer is optional.

Further, the described embodiments are not limited to the above-mentioned examples of layout of exit pupil expansion devices with a partially reflective and partially transmissive layer in projection systems. According to the various constraints of the considered projection system (orientation of the input beam, desired orientation of the output beam, etc.), it will be within the abilities of those skilled in the art to provide other layouts.

Further, in the examples of exit pupil expansion devices described in relation with FIGS. 2 to 6, the injection of the image projection beam into the transparent plate of the device is performed through the upper surface of the transparent plate. The described embodiments are not limited to this specific case. As an example, it will be within the abilities of those skilled in the art to adapt the described devices to inject the projection beam into the transparent layer via the lower surface of the transparent plate. More generally, the injection may be performed either on the side comprising the partially reflective and partially transmissive layer of the device, or on the other side, according to the various practical constraints of the device (bulk, etc.).

Further, the described embodiments of image projection systems are not limited to a use in head-up displays and may be used in other applications.

Further, the described embodiments of exit pupil expansion systems with a partially reflective and partially transmissive layer are not limited to a use in image projection systems but may be used in other applications.

What is claimed is:

1. An optical device comprising:
   a transparent plate having a first reflective surface;
   a first partially reflective and partially transmissive layer coating a second surface of the transparent plate opposite to the first surface, wherein the first layer is partially reflective and partially transmissive for a given wavelength and wherein the first layer has a transmission coefficient gradually varying along at least one direction parallel to the plane of the second surface; and
   a second layer coating the surface of the first layer opposite to the transparent plate, the second layer being made of a material having its optical index differing from the optical index of the transparent plate by less than 10%, and the second layer comprising, on its surface opposite to the first layer, structures forming a diffraction grating capable of promoting the extraction of light to the outside of the transparent plate.

2. The device of claim 1, wherein the first surface of the transparent plate is coated with a non-transmissive reflective layer.

3. The device of claim 1, wherein the second layer comprises, on the side of its surface opposite to the first layer, grooves of triangular section defining prisms.

4. The device of claim 1, wherein the second layer comprises, on the side of its surface opposite to the first layer, structures forming an echelette grating or blazed grating.

5. The device of claim 1, wherein the first layer is a metal layer.

6. The device of claim 1, further comprising at least one device of injection of an image projection light beam into the transparent plate.

7. The device of claim 6, wherein said at least one injection device is located at a first end of the transparent plate, and wherein the transmission coefficient of the first layer gradually increases between the first end and a second end of the transparent plate opposite to the first end.

8. The device of claim 6, comprising two injection devices located at opposite ends of the transparent plate, wherein the transmission coefficient of the first layer gradually increases between each of the ends and a central region of the transparent plate.

9. The device of claim 6, comprising two injection devices located at opposite ends of the transparent plate.

10. A projection system comprising an image display device and at least one optical device of claim 1.

11. A head-up display comprising the projection system of claim 10, and a beam splitter capable of combining an image projected by the projection system with an image of a real scene.

12. A projection system comprising an image display device and at least one optical device of claim 1, the at least one optical device comprising a first optical device and a second optical device, wherein at least one direction of the first device is orthogonal to at least one direction of the second device.

13. The device of claim 1, wherein the first layer has a thickness gradually varying along the at least one direction parallel to the plane of the second surface.

* * * * *